(12) United States Patent
Tsujioka et al.

(10) Patent No.: US 8,186,519 B2
(45) Date of Patent: May 29, 2012

(54) POROUS CURED EPOXY RESIN

(75) Inventors: Norio Tsujioka, Tokyo (JP); Satoshi Aoki, Tokyo (JP); Ken Hosoya, Kyoto (JP)

(73) Assignee: Emaus Kyoto, Inc., Kyoto-Shi (JP)

( * ) Notice: Subject to any disclaimer, the term of this patent is extended or adjusted under 35 U.S.C. 154(b) by 759 days.

(21) Appl. No.: 11/794,698

(22) PCT Filed: Jan. 6, 2006

(86) PCT No.: PCT/JP2006/300069
§ 371 (c)(1),
(2), (4) Date: Aug. 9, 2007

(87) PCT Pub. No.: WO2006/079760
PCT Pub. Date: Aug. 3, 2006

(65) Prior Publication Data
US 2008/0210626 A1  Sep. 4, 2008

(30) Foreign Application Priority Data
Jan. 7, 2005 (JP) ................. 2005-002550

(51) Int. Cl.
*B01D 71/46* (2006.01)
*B01D 15/08* (2006.01)
*B01D 15/00* (2006.01)
*B01D 61/00* (2006.01)

(52) U.S. Cl. ............... 210/510.1; 210/656; 210/500.22; 210/198.2

(58) Field of Classification Search .............. None
See application file for complete search history.

(56) References Cited

U.S. PATENT DOCUMENTS

| | | | |
|---|---|---|---|
| 4,772,635 A | 9/1988 | Mitschker et al. |
| 4,867,662 A | 9/1989 | Shimahara et al. |
| 4,889,632 A | 12/1989 | Svec et al. |
| 4,923,610 A | 5/1990 | Svec et al. |
| 4,952,349 A | 8/1990 | Svec et al. |
| 5,334,310 A | 8/1994 | Frechet et al. |
| 6,465,742 B1 | 10/2002 | Hiraoka et al. |
| 6,693,159 B1 | 2/2004 | Holmes et al. |

FOREIGN PATENT DOCUMENTS

| | | |
|---|---|---|
| EP | 0 194 757 A2 | 9/1986 |
| EP | 0 225 535 A2 | 6/1987 |

(Continued)

OTHER PUBLICATIONS

Kunz-Douglass et al., "A Model for the toughness of epoxy-rubber particulate composites," Journal of Materials Science, vol. 15, 1980, pp. 1109-1123.

(Continued)

*Primary Examiner* — Krishnan S Menon
(74) *Attorney, Agent, or Firm* — Birch, Stewart, Kolasch & Birch, LLP

(57) ABSTRACT

A porous object comprising a three-dimensional network skeleton of a cured epoxy resin and having interconnecting pores, characterized in that the three-dimensional network skeleton forms a non-particle-aggregation type porous object constituted of a three-dimensional branched columnar structure, the proportion of aromatic-ring-derived carbon atoms to all the carbon atoms as a component of the cured epoxy resin is 0.10-0.65, and the porous object has a porosity of 20-80% and an average pore diameter of 0.5-50 μm.

10 Claims, 1 Drawing Sheet

FOREIGN PATENT DOCUMENTS

| | | |
|---|---|---|
| EP | 1 273 599 A1 | 1/2003 |
| JP | 63-94155 A | 4/1988 |
| JP | 2-1747 A | 1/1990 |
| JP | 2-293024 A | 12/1990 |
| JP | 2-293025 A | 12/1990 |
| JP | 2000-204189 A | 7/2000 |
| JP | 2000204189 A * | 7/2000 |
| JP | 3168006 B2 | 3/2001 |
| JP | 2001-181436 A | 7/2001 |
| JP | 2001181436 A * | 7/2001 |
| JP | 2002-536478 A | 10/2002 |
| JP | 2003-4921 A | 1/2003 |
| JP | 2003004921 A * | 1/2003 |
| JP | 2004-244607 A | 9/2004 |
| WO | WO 2004/078822 A1 | 9/2004 |

OTHER PUBLICATIONS

Nakanishi et al., "Pore Structure Control of Silica Gels Based on Phase Separation," Journal of Porous Materials, vol. 4, 1997, pp. 67-112.

Supplementary European Search Report, dated Mar. 22, 2011, for European Application No. 06702050.3.

Indian Office Action issued on Sep. 24, 2010 in Indian Patent Application No. 5141/DELNP/2007.

* cited by examiner

POROUS CURED EPOXY RESIN

TECHNICAL FIELD

The present invention relates to a porous object having a three-dimensional network skeleton of a cured epoxy resin, which object is a non-particle-aggregation type porous object constituted of the three-dimensional network structure composed of a three-dimensional branched columnar structure of a cured epoxy resin and to its manufacturing method, and more particularly to a porous cured epoxy resin used as a carrier of so-called affinity gels, such as an enzyme carrier and an antibody carrier, or for a purification medium, an absorption/adsorption medium, a filler for column chromatography and the like and to its manufacture method.

BACKGROUND ART

Porous crosslinked polymer resins used for separation and purification media and fillers of column chromatography are conventionally manufactured as microsphere beads by methods such as suspension polymerization, emulsion polymerization and dispersion polymerization and used. On the other hand, in recent years, separation media (monolith type polymer separation media) having an integral structure which can convey a liquid at a low pressure through a larger flow path than bead separation media and simultaneously exhibit a separation performance equal to or better than beads due to their fine skeleton, have been studied and developed and partially produced commercially.

Monolith type polymer separation media have advantages in cost and performances, in which the monolith type polymer separation media do not need to fit to a column casing; they can be easily used for fabrication of columns of every type from separation and purification columns to high-performance capillary columns with a homogenous solution as a starting raw material; apparatuses can be fabricated at a low cost; and the product service life is long.

On the other hand, there is a demand of using monolith type polymer separation media for developing the special molecular recognizability, especially of molecules having a planar structure, to separate and recover contaminants and the like. However, use of particle media as separation media for such applications cause severe clogging, and the particle media are quite beyond practical use. That is, monolith type polymer separation media, which are applicable to large apparatuses and have the molecular recognizability, have strong needs also for dealing with environmental problems.

For such needs, in recent years, monolith type silica columns applying the sol-gel method as described in Non-Patent Document 2 have been developed and widely utilized for the high-performance liquid chromatography. The monolith type silica, since it has a skeleton having a three-dimensional network structure and the network is a non-particle aggregation type porous object constituted of a three-dimensional branched columnar structure, has a high strength and a large specific surface area in spite of a high porosity, and is remarkably useful as a separation medium. However, columns made of silica, since they have a very high price, a low alkali resistance and a low impact resistance due to brittleness, do not exhibit the recognizability of planar-structure molecules without being subjected to a special surface treatment, and is difficult to use for large-sized monolith separation media, cannot meet the above-mentioned needs at present.

On the other hand, with respect to a monolith type polymer separation medium composed of a polymer, for example, Patent Document 1 discloses membranes composed of a macroporous crosslinked polymer formed by mutually linking microsphere bodies of a crosslinked polymer having a size of 0.05 to 0.5 μm, and their manufacturing method.

Although Patent Document 1 describes that the membranes are stamped out from macroporous sheets of a polymer and effectively used for separation of macromolecules and small molecules, since the membranes do not have a function as chromatography, namely a function of repeating the adsorption-desorption when separated molecules pass through the membranes, the membranes do not have the recognizability of molecular structures.

Patent Document 2 discloses a monolith type polymer separation medium obtained by the radical polymerization and having specific small pores and large pores, and its manufacturing method. It contends that use of the separation medium allows efficient separation of very large substances, which are conventionally impossible to separate, such as protein aggregates, micells and nucleic acids and that an integral continuous bed, which is impossible to manufacture with ordinary particle-filled columns, can be manufactured. Patent Document 3 discloses a method for manufacturing a monolith type polymer separation medium composed of a crosslinked polymer in a supercritical carbon dioxide.

However, the monolith type polymer separation medium manufactured by either of the methods described in Patent Document 2 and Patent Document 3 has a particle-aggregation type porous structure and does not form a non-particle-aggregation type three-dimensional network porous object constituted of a three-dimensional branched columnar structure of the present invention.

The monolith type porous objects composed of particle aggregates, since they have a low strength and rigidity and have a small specific surface area of the porous objects when the porosity is heightened and the liquid flow path volume is enlarged, cannot be used especially as a large-sized separation medium. Either of them can be used as a monolith type polymer separation medium, but does not have the molecular structure recognizability.

The monolith type porous object composed of particle aggregates as mentioned in the present description means an integral porous object whose whole structure is maintained with individual microparticles mutually linked, and whose individual particles constituting the porous object can be observed if its microstructure is observed by an electron microscope, etc.

Patent Document 4 discloses a method for forming an interconnecting porous object obtained by mixing a non-solvent type thermosetting resin, at least one of a polyalkylene oxide, polyalkylene glycol and their derivatives which are compatible with the thermosetting resin, and a hardener of the thermosetting resin in a specific proportion, and curing the mixture. Patent Document 5 discloses a thermosetting resin porous body obtained by adding further another ingredient when the interconnecting porous object disclosed in Patent Document 4 is formed, and its manufacturing method, and also describes epoxy resins as the thermosetting resin. However, either of these patent documents only discloses a monolith type porous object composed of particle aggregates and its manufacturing method, and does not disclose a polymer porous object having a three-dimensional network structure and also non-particle-aggregation type porous object in which the network has a columnar structure.

That is, the monolith type porous objects composed of particle aggregates obtained in Patent Document 6 and Patent Document 7, since they have a low strength and rigidity and have a small specific surface area of the porous objects when the porosity is heightened and the liquid flow path volume is enlarged, cannot be used especially as a large-sized separation medium.

As described above, a monolith type separation medium which has a high strength and a low price, can be manufactured in the industrial mass production, can treat a large amount, and has the molecular recognizability, is expected to be applied to applications such as recovery of contaminants, but has not been provided at present.

Patent Document 1: JP-A-2-1747
Patent Document 2: Japanese Patent No. 3168006
Patent Document 3: JP-A-2002-536478
Patent Document 4: JP-A-2001-181436
Patent Document 5: JP-A-2004-244607
Non-Patent Document 1: S. Kunz-Douglass, P. Beaumont, M. F. Ashby, J. Mater. Sci., 15, 1109 (1980)
Non-Patent Document 2: K. Nakanishi, J. Porous Materials, 4, 67 (1997)

DISCLOSURE OF THE INVENTION

Problem to be Solved by the Invention

The present invention is to solve the above-mentioned conventional problems, and has an object to provide a porous cured epoxy resin of a separation medium which can be used for capillary columns to large-sized treatment apparatuses, can selectively distinguish substances having a planar molecular structure such as poisonous dioxins and PCBs (polychlorinated biphenyls), has a low back-pressure, and can treat a large amount, and its manufacturing method.

Means for Solving the Problem

As a result of extensive studies to solve such problems, the present inventors have found that a porous object having a three-dimensional skeleton and also non-particle-aggregation type porous object constituted of a three-dimensional branched structure of a cured epoxy resin in which the network has a columnar structure is obtained by fabricating a homogeneous mixed solution by dissolving an epoxy resin and a hardener having specific molecular structures in a porogen in a specific proportion, thereafter allowing them to react the solution by heating to polymerize, spinodally decomposing the polymerized resin and the porogen, three-dimensionally crosslinking the polymerized resin before the bicontinuous structure becomes unstable due to the growth of phase separation and transits to a particle aggregation structure to freeze and fix the bicontinuous structure based on the spinodal decomposition of the polymerized resin and the porogen, and then removing the porogen. The present inventors have also found that the obtained porous cured epoxy resin is a separation medium which exhibits a high molecular recognizability of organic compounds having a planar structure. This has lead to the completion of the present invention.

Namely, the present invention is to provide a porous cured epoxy resin having a structure as described below, a monolith type separation medium composed of the porous object, and its manufacturing method.

Specifically, they are:
(1) A porous object comprising a three-dimensional network skeleton of a cured epoxy resin and interconnecting pores, characterized in that the three-dimensional network skeleton forms a non-particle-aggregation type porous object constituted of a three-dimensional branched columnar structure; a proportion of aromatic-ring derived carbon atoms to all the carbon atoms constituting the cured epoxy resin is 0.10 to 0.65; and the porous object has a porosity of 20% to 80% and an average pore diameter is 0.5 µm to 50 µm;
(2) The porous object according to (1), wherein the porous object has a logarithmic distribution width of not more than 0.7 at the height of ¼ of the maximum of a differential pore distribution measured by the mercury penetration method;
(3) The porous object according to (1) or (2), wherein the porous object has a separation factor ($\alpha_{T/O}$), expressed by a ratio ($k'_T/k'_O$) of distribution coefficients of triphenylene and o-terphenyl, of not less than 2;
(4) The porous object according to any one of (1) to (3), wherein the porous object of the cured epoxy resin has one of sheet-like, rod-like and cylindrical shapes;
(5) A separation medium comprising a porous object according to any one of (1) to (4);
(6) A method for manufacturing a porous object according to any one of (1) to (4), comprising the steps of: dissolving in a porogen an epoxy resin and a hardener which are formulated such that a proportion of aromatic-ring-derived carbon atoms to all the carbon atoms constituting the porous cured epoxy resin is 0.10 to 0.65, subjecting the solution to polymerization by heating, and removing the porogen;
(7) The manufacturing method according to (6), wherein the epoxy resin and the hardener are a combination of an aromatic epoxy resin and a nonaromatic hardener, or a combination of a nonaromatic epoxy resin and an aromatic hardener;
(8) The manufacturing method according to (7), wherein the hardener is one of an aromatic amine and a nonaromatic amine; and
(9) The manufacturing method according to (6), wherein the epoxy resin and the hardener are a combination of an aromatic epoxy resin and an alicyclic amine, or a combination of an alicyclic epoxy resin and an aromatic amine.

ADVANTAGE OF THE INVENTION

The porous cured epoxy resin provided by the present invention is useful as a monolith type separation medium made of a polymer excellent in the recognizability of molecules having a planar structure. The porous cured epoxy resin provided by the present invention is suitable for the water treatment especially in a large scale, allows the treatment in a large amount at a lower pressure, and further, for example, can selectively remove dioxins, PCBs and the like, which have a planar molecular structure, from water containing contaminants generated in the sludge treatment. The porous cured epoxy resin provided by the present invention, since its polymer surface has various functional groups to facilitate the surface modification and the like, is useful as a characteristic base material for a separation and purification medium, for example, separation of proteins and enzymes and purification of pharmaceuticals.

BEST MODE FOR CARRYING OUT THE INVENTION

Figure 1:
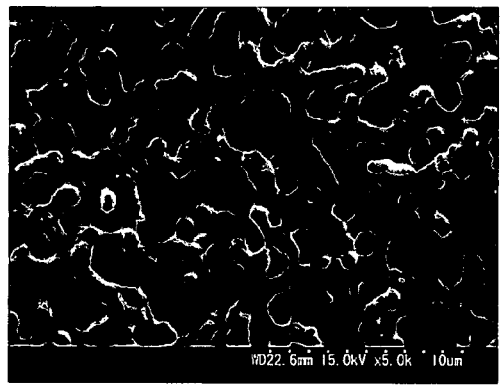
FIG. 1 is a photograph (5,000× magnification) by a scanning electron microscope of the cross section of a porous cured epoxy resin obtained in Example 1.

The porous cured epoxy resin of the present invention, in which the cured epoxy resin forms a three-dimensional branched columnar structure, is formed of a specific combination of an epoxy resin and a hardener used as raw materials.

Specifically, the combination of an epoxy resin and a hardener is preferably a combination of an aromatic epoxy resin and a nonaromatic hardener, especially a hardener of an alicyclic amine, or a combination of a nonaromatic epoxy resin and a hardener of an aromatic amine, especially an alicyclic epoxy resin and a hardener of an aromatic amine.

Among these combinations, the case of using an alicyclic epoxy resin as a nonaromatic epoxy resin and an alicyclic amine as a nonaromatic hardener, which case has a higher thermal resistance of the cured material than the case of using an aliphatic epoxy resin and an aliphatic amine, is suitable for applications to separation media.

An epoxy resin and a hardener are each preferably used singly, but may be each in a mixture of two or more. However, in the case where either one of an epoxy resin and a hardener or both of them are mixtures of aromatic one and a nonaromatic one, an obtained porous object is liable to become a porous object in which the non-particle-aggregation type network structure and the particle aggregates are both mixedly present, which is unpreferable.

Hereinafter, epoxy resins and hardeners usable in the present invention will be exemplified.

Among the epoxy resins used in the present invention, aromatic epoxy resins containing aromatic-ring-derived carbon atoms include bisphenol A epoxy resins, brominated bisphenol A epoxy resins, bisphenol F epoxy resins, bisphenol AD epoxy resins, stilbene type epoxy resins, biphenyl type epoxy resins, bisphenol A novolac epoxy resins, cresol novolac epoxy resins, diaminodiphenylmethane epoxy resins, polyphenyl-base epoxy resins such as a tetrakis(hydroxyphenyl)ethane-base epoxy resin, fluorene-containing epoxy resins and heteroaromatic-ring-containing epoxy resins such as triglycidyl isocyanurate and triazine-ring-containing epoxy resins.

The aromatic epoxy resins are preferably bisphenol A epoxy resins, brominated bisphenol A epoxy resins, bisphenol F epoxy resins, bisphenol AD epoxy resins, fluorene-containing epoxy resins and triglycidyl isocyanurate, especially preferably bisphenol A epoxy resins, brominated bisphenol A epoxy resins, bisphenol F epoxy resins, bisphenol AD epoxy resins, fluorene-containing epoxy resins and triglycidyl isocyanurate which have an epoxy equivalent weight of not more than 500 and a melting point of not more than 100° C.

Nonaromatic epoxy resins not containing aromatic-ring-derived carbon atoms include aliphatic glycidyl ether epoxy resins, aliphatic glycidyl ester epoxy resins, alicyclic glycidyl ether epoxy resins and alicyclic glycidyl ester epoxy resins.

The nonaromatic epoxy resins are preferably alicyclic glycidyl ether epoxy resins and alicyclic glycidyl ester epoxy resins, especially preferably alicyclic glycidyl ether epoxy resins and alicyclic glycidyl ester epoxy resins which have an epoxy equivalent weight of not more than 500 and a melting point of not more than 100° C.

Among the hardeners used in the present invention, aromatic hardeners containing aromatic-ring-derived carbon atoms include aromatic amines such as metaphenylenediamine, diaminodiphenylmethane, diaminodiphenylsulfone, benzyldimethylamine and dimethylaminomethylbenzene, aromatic acid anhydrides such as phthalic anhydride, trimellitic anhydride and pyromellitic anhydride, phenol resins, phenol novolac resins, and amines having heteroaromatic rings such as triazine. Preferable are aromatic amine compounds having at least two primary amines in their molecule, and especially preferable are metaphenylenediamine, diaminodiphenylmethane and diaminodiphenylsulfone.

Nonaromatic hardeners not containing aromatic-ring-derived carbon atoms include aliphatic amines such as ethylenediamine, diethylenetriamine, triethylenetetramine, tetraethylenepentamine, iminobispropylamine, bis(hexamethylene)triamine, 1,3,6-trisaminomethylhexane, polymethylenediamines, trimethylhexamethylenediamine and polyether diamines, alicyclic polyamines such as isophoronediamine, menthanediamine, N-aminoethylpiperazine, 3,9-bis(3-aminopropyl)2,4,8,10-tetraoxaspiro(5,5)undecane adduct, bis(4-amino-3-methylcyclohexyl)methane and bis(4-aminocyclohexyl)methane and modified products thereof, and aliphatic polyamido amines composed of other polyamines and a dimmer acid. Preferable are alicyclic amine compounds having at least two primary amines in their molecule, and especially preferable are bis(4-amino-3-methylcyclohexyl)methane, bis(4-aminocyclohexyl)methane and the like.

Porogens used in the present invention denote solvents which can dissolve epoxy resins and hardeners, and can cause the reaction-induced phase separation after an epoxy resin and a hardener are polymerized. They include, for example, cellosolves such as methyl cellosolve and ethyl cellosolve, esters such as ethylene glycol monomethyl ether acetate and propylene glycol monomethyl ether acetate, and glycols such as polyethylene glycols and polypropylene glycols. Among them preferable are polyethylene glycols having a molecular weight of not more than 600, methyl cellosolve, ethyl cellosolve, ethylene glycol monomethyl ether acetate and propylene glycol monomethyl ether acetate, and especially preferable are polyethylene glycols having a molecular weight of not more than 200 and propylene glycol monomethyl ether acetate.

Even if a solvent cannot dissolve or hardly dissolve an individual epoxy resin or an individual hardener at ordinary temperature, the solvent which can dissolve an adduct derived from the epoxy resin and the hardener can be used as a porogen. Such a porogen includes, for example, brominated bisphenol A epoxy resins (Japan Epoxy Resins Co., Ltd., trade name: Epikote 5058).

In the present invention, the kinds and the amounts of an epoxy resin and a hardener must be decided such that the proportion of aromatic-ring-derived carbon atoms to all the carbon atoms constituting a porous cured epoxy resin is in the range of 0.10 to 0.65.

When the proportion of aromatic-ring-derived carbon atoms to all the carbon atoms is less than 0.10, a separation medium of the porous object decreases in the recognizability of a planar molecular structure. When the proportion of aromatic-ring-derived carbon atoms to all the carbon atoms exceeds 0.65, a non-particle-aggregation type porous cured object constituted of a three-dimensional branched columnar network skeleton of a cured epoxy resin is difficult to obtain.

In the present invention, the proportion of formulation of an epoxy resin and a hardener is preferably adjusted in the range of a hardener equivalent weight of 0.6 to 1.5 per epoxy equivalent weight in the range satisfying the proportion of aromatic-ring-derived carbon atoms to all the carbon atoms. With the proportion of the hardener equivalent weight of less than 0.6, the crosslinking density of the cured material becomes low, sometimes decreasing thermal resistance and solvent resistance. By contrast, with that exceeding 1.5, many unreacted functional groups are left, and remain in the cured material as they are unreacted and cause inhibiting the improvement in the crosslinking density, which is unpreferable.

The porous cured epoxy resin of the present invention is manufactured by dissolving a mixture of an epoxy resin and a hardener in a porogen which is nonreactive with the mixture and can dissolve the mixture at ordinary temperature or by heating, polymerizing the solution by heating, and after the polymerized material and the porogen are spinodally phase-separated and before the phase separation progresses and the bicontinuous structure vanishes, freezing and fixing the structure by the crosslinking reaction, and then removing the porogen.

Herein, if an objective porous structure cannot be obtained, addition of a hardening accelerator is sometimes effective. As hardening accelerators usable are well-known substances, which include, for example, tertiary amines such as triethylamine and tributylamine, and imidazoles such as 2-phenol-4-methylimidazole, 2-ethyl-4-methylimidazole and 2-phenol-4,5-dihydroxymethylimidazole.

For obtaining the porous object of the present invention, the process from the polymerization initiation till the structure freezing is completed preferably in 120 min at the longest. Further, the process from occurrence of cloud points due to the phase separation till the structure freezing due to the three-dimensional crosslinking is preferably in 30 min. The polymerization temperature is set with these conditions as a measure.

For example, as described above, after an epoxy resin and a hardener are selected so as to be in the range of a hardener equivalent weight of 0.6 to 1.5 per epoxy equivalent weight in the range satisfying the proportion of aromatic-ring-derived carbon atoms to all the carbon atoms, the raw materials are each charged in a reaction vessel and a porogen is added. The added porogen and the epoxy resin are dissolved, and then the hardener is added and dissolved. Herein, when an epoxy resin is solid at ordinary temperature, after the crushed resin is charged and dissolved in a porogen heated at not more than 100° C., a hardener is added and dissolved, and immediately the solution is heated at a predetermined polymerization temperature for polymerization. After the polymerization by heating, the polymerization progresses and as the polymer ingredient increases, the spinodal phase separation occurs and the bicontinuous structure develops. The phase separation further progresses and the structure is frozen and fixed by progressing the crosslinking reaction of the epoxy resin before the bicontinuous structure vanishes, thus providing a desired three-dimensional network structure. However, since this phenomenon cannot be visually confirmed, an optimum temperature profile is decided and controlled by previously identifying the structure obtained by changing on trial the kind and amount of hardeners (optionally including hardening accelerators) and the amount of a porogen, with an electron microscope and the like. Specific conditions will be described in examples mentioned later.

In the present invention, for fully crosslinking the cured material, after the structure freezing, after-cure is preferably additionally performed. Since if the after-cure is performed after the porogen has been removed, shrinkage occurs, sometimes causing change in the porous structure, the after-cure is more preferably performed without removal of the porogen. When the used porogen is a solvent having a low boiling point, a method in which after the solvent has been replaced by a high-boiling-point solvent, the after-cure is performed, and other methods are employed. If a porous object having an insufficient crosslinking is used as a liquid chromatography separation medium, the number of theoretical stages decreases. Therefore, a sufficient crosslinking reaction must be performed.

The porous cured epoxy resin according to the present invention must have a porosity of 20% to 80%. With the porosity of less than 20%, when the cured material is used as a separation medium, the porosity is too low to raise the permeability, which is not practical. By contrast, with that exceeding 80%, the strength of the porous object decreases.

The porous cured epoxy resin of the present invention has an average pore diameter of not less than 0.5 μm and not more than 50 μm. With that of less than 0.5 μm, the pressure in the liquid conveyance becomes high. With that exceeding 50 μm, the strength of the porous object decreases. When a contaminated water and the like containing insoluble materials such as sludge together with a trace amount of a compound having a planar molecular structure is used as a solution to be separated, for preventing clogging, the porous object having an average pore diameter of not less than 5 μm is preferably used.

The porous cured epoxy resin of the present invention preferably has a logarithmic distribution width of not more than 0.7 at the height of ¼ of the maximum value of a differential pore distribution measured by the mercury penetration method. The logarithmic distribution width at the height of ¼ of the maximum value of the differential pore distribution is an index indicating a spread of the pore distribution, and indicates logarithmically a width of the logarithmic distribution at the height of ¼ of the maximum of the pore distribution. If the logarithmic distribution width exceeds 0.7 at the height of ¼ of the maximum, the number of theoretical stages as a separation medium has a tendency of decreasing.

Since the porosity, pore diameter, pore diameter distribution and the like of a porous object change depending on the kinds and proportions of raw materials such as an epoxy resin, an epoxy hardener and a porogen to be used and conditions such as temperature, stirring and pressure, for obtaining a porosity, pore diameter and pore diameter distribution of a desired porous object, a phase diagram of the system is preferably drawn to select optimum conditions. Although the phase separation changes with time, for fixing a bicontinuous structure of a resin and a porogen in a specific condition and forming a stable porous structure, the molecular weight and molecular weight distribution of a polymerized epoxy resin, the viscosity of the system and the crosslinking rate at the time of phase separation are generally exactly controlled.

Since the porous cured epoxy resin of the present invention can assume optional shapes such as sheet-like, rod-like and cylindrical shapes, it can be properly used depending on its applications. It can be used for from large-diameter columns up to capillary columns as a filling medium for columns for liquid chromatography.

For the recognizability of the planar molecular structure in the liquid chromatography columns, the separation factor $\alpha_{T/O}$ expressed by a ratio ($k'_{triphenylene}/k'_{orthoterphenyl}$, hereinafter, also referred to as $k'_T/k'_O$) of distribution coefficients of triphenylene to o-terphenyl, described in Document "Kazuhiro Kimata, et. al, Chromatographic Characterization of Silica $C_{18}$ Packing Materials. Correlation between a Preparation Method and Retention Behavior of Stationary Phase, Journal of Chromatographic Science, Vol. 27, December 1989, 721-728", can be utilized as an index. The separation medium according to the present invention has a peculiar recognizability for organic compounds having a planar structure and the $\alpha_{T/O}$ of the columns is found to indicate a value of not less than 2 without a specific surface modification.

Of course, since the porous object is a cured epoxy resin, the surface thereof has functional groups and can be modified by the grafting reaction and the like according to purposes.

Since the porous cured epoxy resin according to the present invention is three-dimensionally crosslinked and excellent in chemical resistance and thermal resistance, it can be used under a severe environment.

EXAMPLES

Hereinafter, the present invention will be further specifically described by way of Examples of the present invention and Comparative Examples, but the scope of the present invention is not limited thereto. Evaluation of separation media is by the following methods.

(Observation of Structures of Porous Objects by Scanning Electron Photomicrograph)

Cross sections of porous objects were photographed with a scanning electron microscope to observe porous structures.

(Measurement of the Content of Aromatic-Ring-Derived Carbon Atoms by NMR)

The content of aromatic-ring-derived carbon atoms in all the carbon atoms was determined by the solid $^{13}$C—NMR. A cured epoxy resin was crushed, charged in an MAS probe, and measured by the DD/MAS method (dipole decoupling & magic angle spinning) using a DSX 400 spectrometer (Bruker Co.) at a pulse width of 5.0 μsec ($^1$H90° pulse). For example, in Example 1, the content of aromatic-ring-derived carbon atoms in all the carbon atoms was determined from a peak integrated value A of the aromatic-ring-derived chemical shift, 90 to 210 ppm, and a peak integrated value B of the saturated carbon-derived chemical shift, 10 to 90 ppm, by the following expression:

(Content of aromatic-ring-derived carbon atoms in all the carbon atoms)=$A/(A+B)$ (Measurement of Porosity)

The porosity of porous objects was calculated by the following expression:

Porosity(%)=$(1-W/\rho V)\times 100$

Herein,

W: dry weight (g) of a porous object
V: apparent volume (cm$^3$) of a porous object
ρ: true density (g/cm$^3$) of a resin The true density of a resin was a value measured according to JIS-K7112 (B method I) after a porous object was immersed in ethanol and deaerated.

(Measurement of Average Pore Diameters, and Measurement of Logarithmic Distribution Widths at the Heights of ¼ of the Maximums of Differential Pore Distributions)

The pore diameter distributions and average pore diameters of porous objects were measured by the mercury penetration method using an Autopore 9220 (Shimadzu Corp.). The difference between common logarithms of two pore diameters at the heights of ¼ of the maximum of a differential pore distribution obtained by taking the first order derivative of a cumulative curve of the pore amounts for measured pore diameters, was denoted as a logarithmic distribution width at the height of ¼ of the maximum of the differential pore distribution. As an average pore diameter, a median diameter at the condition of an initial pressure of 20 kPa was used.

(Measurement of Separation Factor)

HPLC columns of a size of 11.8 mm (inner diameter)×12.4 mm (outer diameter) were fabricated of fabricated porous cured epoxy resins; as a mobile phase, an acetonitrile/water mixed solution was used; the HPLC measurement of triphenylene and o-terphenyl was conducted at a flow rate of 1 ml/min at a temperature of 40° C.; each distribution coefficient (k'$_T$, k'$_O$) was determined; and then the separation factor α$_{T/O}$ which is expressed by a ratio of the coefficient was determined.

Example 1

22 g of a bisphenol A epoxy resin (Japan Epoxy Resins Co., Ltd., trade name: Epikote 828) was dissolved in 36 g of methoxymonopropylene glycol acetate (Daicel Chemical Industries Ltd.) to prepare an epoxy resin/porogen solution. Then, 6 g of bis(4-aminocyclohexyl)methane (New Japan Chemical Co., Ltd., trade name: Wandamine HM) was dissolved in 36 g of methoxymonopropylene glycol acetate to prepare a hardener/porogen solution.

The epoxy resin/porogen solution and the hardener/porogen solution were heated to 60° C., defoaming in a vacuum, and then mixed in a mixer, and the mixed solution was poured in a metal mold of 20 mm in diameter which was heated at 120° C., and held for 10 h as it was. After cooling, the cured material was taken out, immersed in ethanol of 60° C. for 20 h to remove the porogen, and post-cured at 160° C. for 5 h. The content of the aromatic-ring-derived carbon atoms, the porosity, the average pore diameter and the logarithmic distribution width at the height of ¼ of the maximum of the differential pore distribution measured by the mercury penetration method of the obtained porous cured epoxy resin, are shown in Table 1. This porous object was cut into a cylindrical shape of 12 mm in diameter and 2 mm in thickness to make a measurement column of the distribution coefficient. The measurement result of the distribution coefficients of o-terphenyl and triphenylene is shown in Table 1. The scanning electron photomicrograph of the porous object is shown in FIG. 1. The photograph reveals that the porous object is one having a three-dimensional network structure composed of a cured epoxy resin as a skeleton, and that the porous object having a three-dimensional network structure is a non-particle-aggregation type porous object constituted of a three-dimensional branched columnar structure of a cured epoxy resin.

Example 2

22 g of a hydrogenated bisphenol A epoxy resin (Dainippon Ink and Chemicals, Inc., trade name: Epiclon 7015) was dissolved in 36 g of methoxymonopropylene glycol acetate (Daicel Chemical Industries Ltd.) to prepare an epoxy resin/porogen solution. 6 g of 4,4'-diaminodiphenylmethane (Tokyo Chemical Industry Co., Ltd.) was dissolved in 36 g of methoxymonopropylene glycol acetate to prepare a hardener/porogen solution. Hereinafter, as in Example 1, a porous cured epoxy resin was fabricated; and the measurement results of the content of the aromatic-ring-derived carbon atoms, the porosity, the average pore diameter, the logarithmic distribution width at the height of ¼ of the maximum of the differential pore distribution measured by the mercury penetration method, and the distribution coefficients, are shown in Table 1.

Example 3

11 g of a bisphenol A epoxy resin (Japan Epoxy Resins Co., Ltd., trade name: Epikote 828) and 11 g of a hydrogenated bisphenol A epoxy resin (Dainippon Ink and Chemicals, Inc., trade name: Epiclon 7015) were dissolved in 36 g of methoxymonopropylene glycol acetate (Daicel Chemical Industries Ltd.) to prepare an epoxy resin/porogen solution. Then, 3 g of bis(4-aminocyclohexyl)methane (New Japan Chemical Co., Ltd., trade name: Wandamine HM) and 3 g of 4,4'-diaminodiphenylmethane (Tokyo Chemical Industry Co., Ltd.) were dissolved in 36 g of methoxymonopropylene glycol acetate to prepare a hardener/porogen solution. Hereinafter, as in Example 1, a porous cured epoxy resin was fabricated; and the measurement results of the content of the aromatic-ring-derived carbon atoms, the porosity, the average pore diameter, the logarithmic distribution width at the height of ¼ of the maximum of the differential pore distribution measured by the mercury penetration method, and the distribution coefficients, are shown in Table 1.

Example 4

24 g of bisphenoxyethanol fluorene glycidyl ether (Osaka Gas Chemicals Co., Ltd., trade name: BPEF-G) was dissolved in 35 g of polyethylene glycol #200 (Nacalai Tesque, Inc.) to prepare an epoxy resin/porogen solution. Then, 6 g of bis(4-aminocyclohexyl)methane (New Japan Chemical Co., Ltd., trade name: Wandamine HM) was dissolved in 35 g of polyethylene glycol #200 to prepare a hardener/porogen solution. Hereinafter, as in Example 1, a porous cured epoxy resin was fabricated; and the measurement results of the content of the aromatic-ring-derived carbon atoms, the porosity, the average pore diameter, the logarithmic distribution width at the height of ¼ of the maximum of the differential pore distribution measured by the mercury penetration method, and the distribution coefficients, are shown in Table 1.

Example 5

26 g of a bisphenol A epoxy resin (Japan Epoxy Resins Co., Ltd., trade name: Epikote 828) was dissolved in 34 g of triethylene glycol (Nacalai Tesque, Inc.) to prepare an epoxy resin/porogen solution. Then, 6 g of bis(4-aminocyclohexyl)methane (New Japan Chemical Co., Ltd., trade name: Wandamine HM) was dissolved in 34 g of triethylene glycol to prepare a hardener/porogen solution.

Figure 2:
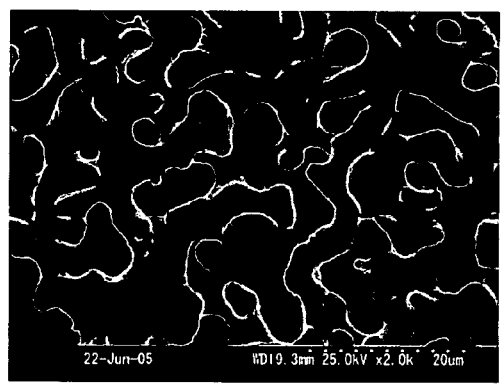
FIG. 2 is a photograph (500× magnification) by a scanning electron microscope of the cross section of a porous cured epoxy resin obtained in Example 5.

The epoxy resin/porogen solution and the hardener/porogen solution were heated to 60° C., defoamed in vacuum, and then mixed in a mixer, and the mixed solution was poured in a metal mold of 20 mm in diameter which was heated at 160° C., and held for 10 h as it was. After cooling, the cured material was taken out, immersed in ethanol of 60° C. for 20 h to remove the porogen, and post-cured at 160° C. for 5 h. The measurement results of the content of the aromatic-ring-derived carbon atoms, the porosity, the average pore diameter, the logarithmic distribution width at the height of ¼ of the maximum of the differential pore distribution measured by the mercury penetration method and the distribution coefficients of the obtained porous cured epoxy resin, are shown in Table 1. The scanning electron photomicrograph of the porous object is shown in FIG. 2. This porous object is also one, like one in Example 1, having a three-dimensional network structure composed of a cured epoxy resin as a skeleton, and the porous object having a three-dimensional network structure is a non-particle-aggregation type porous object constituted of a three-dimensional branched columnar structure of a cured epoxy resin.

Comparative Example 1

24 g of a bisphenol A epoxy resin (Japan Epoxy Resins Co., Ltd., trade name: Epikote 828) was dissolved in 35 g of methoxymonopropylene glycol acetate (Daicel Chemical Industries Ltd.) to prepare an epoxy resin/porogen solution. Then, 6 g of 4,4'-diaminodiphenylmethane (Tokyo Chemical Industry Co., Ltd.) was dissolved in 35 g of methoxymonopropylene glycol acetate to prepare a hardener/porogen solution. Hereinafter, as in Example 1, a porous cured epoxy resin was fabricated; and the measurement results of the content of the aromatic-ring-derived carbon atoms, and the porosity are shown in Table 1; but the obtained formed material was transparent, and clear measurement results of the average pore diameter, the logarithmic distribution width at the height of ¼ of the maximum of the differential pore distribution measured by the mercury penetration method, and the distribution coefficients, were not obtained.

Comparative Example 2

24 g of a hydrogenated bisphenol A epoxy resin (Dainippon Ink and Chemicals, Inc., trade name: Epiclon 7015) was dissolved in 35 g of methoxymonopropylene glycol acetate (Daicel Chemical Industries Ltd.) to prepare an epoxy resin/porogen solution. Then, 6 g of bis(4-aminocyclohexyl)methane (New Japan Chemical Co., Ltd., trade name: Wandamine HM) was dissolved in 35 g of methoxymonopropylene glycol acetate to prepare a hardener/porogen solution. Hereinafter, as in Example 1, a porous cured epoxy resin was fabricated; and the measurement results of the content of the aromatic-ring-derived carbon atoms, the porosity, the average pore diameter, and the logarithmic distribution width at the height of ¼ of the maximum of the differential pore distribution measured by the mercury penetration method are shown in Table 1, but the obtained product was powdery, so the column for the distribution coefficient could not be fabricated.

Comparative Example 3

Figure 3:
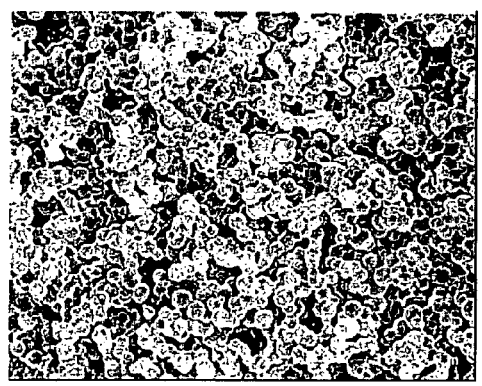
FIG. 3 is a photograph (1,000× magnification) by a scanning electron microscope of the cross section of a porous cured epoxy resin obtained in Comparative Example 3.

12 g of a bisphenol A epoxy resin, and a hydrogenated bisphenol A epoxy resin were dissolved in 35 g of methoxymonopropyleneglycol acetate (Daicel Chemical Industries Ltd.) to prepare an epoxy resin/porogen solution. Then, 6 g of 4,4'-diaminodiphenylmethane and 6 g of bis(4-aminocyclohexyl)methane were dissolved in 35 g of methoxymonopropylene glycol acetate to prepare a hardener/porogen solution. Hereinafter, as in Example 1, a porous cured epoxy resin was fabricated. The scanning electron photomicrograph of this porous object is shown in FIG. 3. The photograph reveals that the obtained porous object is a particle-aggregation type porous object.

TABLE 1

|  | Example 1 | Example 2 | Example 3 | Example 4 |
|---|---|---|---|---|
| Proportion of aromatic-ring-derived carbon atoms (NMR measurement) | 0.43 | 0.20 | 0.33 | 0.40 |
| Porosity (%) | 65 | 50 | 54 | 71 |

TABLE 1-continued

| | | | | |
|---|---|---|---|---|
| Average pore diameter (μm) | 3.5 | 1.1 | 3.3 | 5.2 |
| Logarithmic distribution width at the height of ¼ of the maximum of differential pore distribution measured by mercury penetration method | 0.35 | 0.55 | 0.53 | 0.45 |
| $\alpha_{T/o}$ | 3.8 | 4.0 | 3.9 | 4.3 |
| Porous structure | Non-particle-aggregation type columnar network | Non-particle-aggregation type columnar network | Non-particle-aggregation type columnar network | Non-particle-aggregation type columnar network |

| | Example 5 | Comparative Example 1 | Comparative Example 2 | Comparative Example 3 |
|---|---|---|---|---|
| Proportion of aromatic-ring-derived carbon atoms (NMR measurement) | 0.45 | 0.70 | 0 | 0.32 |
| Porosity (%) | 58 | 0 | 34 | 55 |
| Average pore diameter μm) | 20 | Not measurable | 6.5 | 3.5 |
| Logarithmic distribution width at the height of ¼ of the maximum of differential pore distribution measured by mercury penetration method | 0.48 | Not measurable | 1.3 | Not measured |
| $\alpha_{T/o}$ | 2.8 | Not measurable | Not fabricable | Not measured |
| Porous structure | Non-particle-aggregation type columnar network | (No porous structure could be observed) | (Microparticle-like) | Particle-aggregation type integrated porous structure |

Industrial Applicability

The porous cured epoxy resin provided by the present invention is useful as a monolith type separation medium made of a polymer excellent in the recognizability of molecules having a planar structure. The porous cured epoxy resin provided by the present invention is also suitable especially for the water treatment in a large scale, and can perform the treatment in a large amount at a lower pressure. Further, for example, it can selectively remove dioxins and PCBs, which have a planar molecular structure, from water containing contaminants produced in sludge treatment and the like. Since the porous cured epoxy resin provided by the present invention has various functional groups on its surface and facilitates the surface modification, it is useful as base materials of characteristic separation and purification media, and can be utilized, for example, for separation of proteins and enzymes, and purification of pharmaceuticals.

The invention claimed is:

1. A monolith type polymer separation medium comprising a porous object comprising a three-dimensional network skeleton of a cured epoxy resin and interconnecting pores, characterized in that: the three-dimensional network skeleton forms a non-particle-aggregation type porous object constituted of a three-dimensional branched columnar structure; a proportion of aromatic-ring-derived carbon atoms to all the carbon atoms constituting the cured epoxy resin is 0.10 to 0.65; and the porous object has a porosity of 20% to 80% and an average pore diameter is 0.5 μm to 50 μm, wherein the porous object has a separation factor ($\alpha_{T/O}$), expressed by a ratio ($k'_T/k'_O$) of distribution coefficients of triphenylene and o-terphenyl, of not less than 2.

2. The monolith type chromatographic column separation medium comprising a porous object according to claim 1, wherein the porous object has a logarithmic distribution width of not more than 0.7 at the height of ¼ of the maximum of a differential pore distribution measured by the mercury penetration method.

3. The monolith type chromatographic column separation medium comprising a porous object according to claim 1, wherein the porous object of the cured epoxy resin has one of sheet-like, rod-like and cylindrical shapes.

4. A method for manufacturing the monolith type chromatographic column separation medium comprising a porous object according to claim 1, comprising the steps of:

dissolving in a porogen an epoxy resin and a hardener which are formulated such that a proportion of aromatic-ring-derived carbon atoms to all the carbon atoms constituting the cured epoxy resin is 0.10 to 0.65, subjecting the solution to polymerization by heating, and removing the porogen.

5. The manufacturing method according to claim 4, wherein the epoxy resin and the hardener are a combination of an aromatic epoxy resin and a nonaromatic hardener, or a combination of a nonaromatic epoxy resin and an aromatic hardener.

6. The manufacturing method according to claim 5, wherein the hardener is one of an aromatic amine and a nonaromatic amine.

7. The manufacturing method according to claim 4, wherein the epoxy resin and the hardener are a combination of an aromatic epoxy resin and an alicyclic amine, or a combination of an alicyclic epoxy resin and an aromatic amine.

8. The monolith type chromatographic column separation medium comprising a porous object according to claim 2, wherein the porous object of the cured epoxy resin has one of sheet-like, rod-like and cylindrical shapes.

9. A method for manufacturing the monolith type chromatographic column separation medium comprising a porous object according to claim 2, comprising the steps of:

dissolving in a porogen an epoxy resin and a hardener which are formulated such that a proportion of aromatic-ring-derived carbon atoms to all the carbon atoms constituting the cured epoxy resin is 0.10 to 0.65,
subjecting the solution to polymerization by heating, and
removing the porogen.

10. A method for manufacturing a porous object according to claim 3, comprising the steps of:

dissolving in a porogen an epoxy resin and a hardener which are formulated such that a proportion of aromatic-ring-derived carbon atoms to all the carbon atoms constituting the cured epoxy resin is 0.10 to 0.65,
subjecting the solution to polymerization by heating, and
removing the porogen.

\* \* \* \* \*